United States Patent
Yu et al.

(10) Patent No.: US 9,619,599 B2
(45) Date of Patent: Apr. 11, 2017

(54) SYSTEM FOR AND METHOD OF CHECKING JOULE HEATING OF AN INTEGRATED CIRCUIT DESIGN

(71) Applicant: TAIWAN SEMICONDUCTOR MANUFACTURING COMPANY, LTD., Hsinchu (TW)

(72) Inventors: Chi-Yeh Yu, Hsinchu (TW); Ming-Hsien Lin, Hsinchu County (TW); Wen-Hao Chen, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/471,789

(22) Filed: Aug. 28, 2014

(65) Prior Publication Data
US 2016/0063160 A1   Mar. 3, 2016

(51) Int. Cl.
*G06F 17/50* (2006.01)

(52) U.S. Cl.
CPC ...... *G06F 17/5045* (2013.01); *G06F 2217/06* (2013.01); *G06F 2217/78* (2013.01); *G06F 2217/80* (2013.01)

(58) Field of Classification Search
USPC ...... 716/115, 120, 132–133, 136; 703/13–14
See application file for complete search history.

(56) References Cited

U.S. PATENT DOCUMENTS

| | | | | |
|---|---|---|---|---|
| 5,835,380 A | * | 11/1998 | Roethig | G06F 17/5022 716/108 |
| 5,872,952 A | * | 2/1999 | Tuan | G01R 31/2848 257/E23.079 |
| 2008/0086708 A1 | * | 4/2008 | Rittman | G06F 17/5081 716/52 |
| 2012/0136599 A1 | * | 5/2012 | Inui | G06F 17/5036 702/65 |
| 2012/0317529 A1 | * | 12/2012 | Agarwal | G06F 17/5036 716/113 |
| 2013/0298101 A1 | * | 11/2013 | Chandra | G06F 17/50 716/136 |

\* cited by examiner

*Primary Examiner* — Nghia Doan
(74) *Attorney, Agent, or Firm* — Hauptman Ham, LLP

(57) ABSTRACT

A method of checking joule heating of an integrated circuit design, the method includes dividing the integrated circuit design into a plurality of windows, determining a power index of each window, adjusting the specification current value associated with each of the corresponding windows, and generating a current violation report, by a processor, of the integrated circuit. Each window includes one or more circuit elements. Each circuit element is associated with a corresponding current value. Each window is associated with a corresponding specification current value. Each power index is associated with a corresponding window. An amount of adjustment of the specification current value is a function of the power index of each corresponding window. The current violation report includes one or more entries. Each entry is associated with at least a corresponding window and one or more corresponding current values which exceed the corresponding adjusted specification current value.

20 Claims, 9 Drawing Sheets

$P1 = \text{INDEX} = (L1/W1) \times I_{rms1}^2 + (L2/W2) \times I_{rms2}^2$

| Power Density (PD) in window | $I_{RMS}$ |
|---|---|
| $PD \geq p_{spec1}$ | $C1 \times I_{RMS0}$ |
| $p_{spec1} > PD \geq p_{spec2}$ | $C2 \times I_{RMS0}$ |
| $p_{spec2} > PD \geq p_{spec3}$ | $C3 \times I_{RMS0}$ |
| $PD < p_{spec3}$ | $C4 \times I_{RMS0}$ |

SYSTEM FOR AND METHOD OF CHECKING JOULE HEATING OF AN INTEGRATED CIRCUIT DESIGN

BACKGROUND

The recent trend in miniaturizing integrated circuits (ICs) has resulted in smaller devices which consume less power, yet provide functionality at higher speeds. The miniaturization process has also resulted in stricter design and manufacturing specifications. Various electronic design automation (EDA) tools generate, optimize and verify designs for semiconductor devices while ensuring that the design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
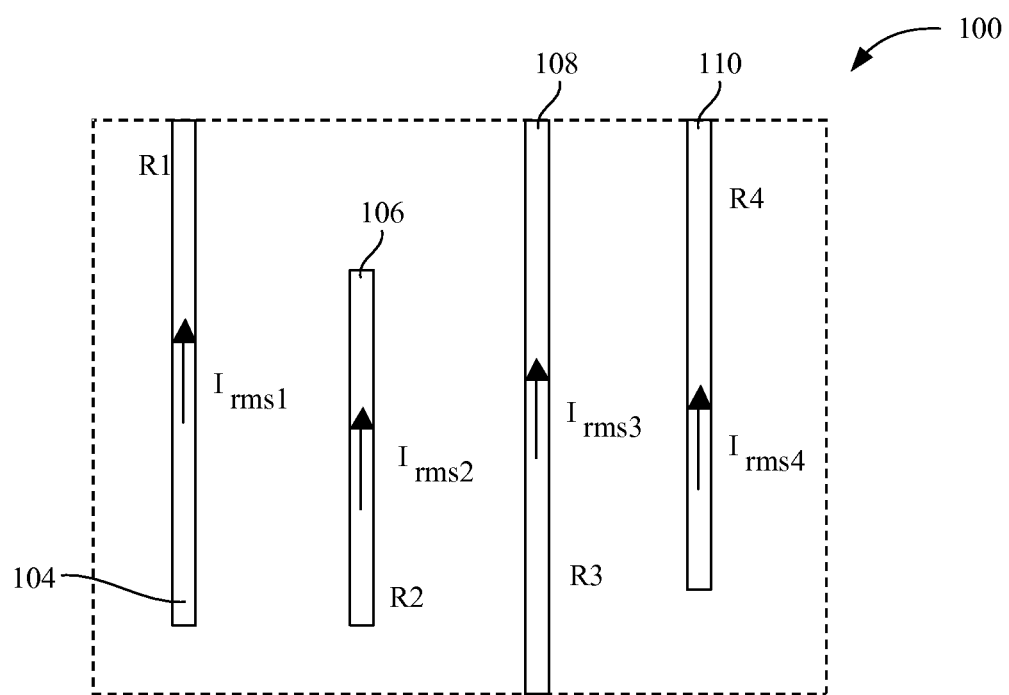
FIG. 1A is a schematic view of an integrated circuit design in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an integrated circuit design, the Joule heating of the design is related to the root mean square (RMS) current values through the corresponding circuit elements in the design and the resistance values of the circuit elements in the design. In some embodiments, for an integrated circuit design, the specification current value of a circuit element is a design threshold or design limit on the RMS current value through the corresponding circuit element to prevent overheating. In some embodiments, the specification current value of a circuit element is based on the RMS current density $J_{rms}$ of the circuit element. In some embodiments, the specification current value of a circuit element is limited by the desired temperature change $\Delta T$ between the substrate of the integrated circuit design and the corresponding circuit elements.

A pessimistic Joule heating model estimates the Joule heating of an integrated circuit design based upon a uniform specification current value in each of the circuit elements in the design. In other words, the pessimistic Joule heating model estimates the Joule heating of an integrated circuit design assuming that the specification current value in each of the circuit elements is the same. However, an over-engineered design results from the pessimistic Joule heating model, where improvements can be made resulting in a more accurate Joule heating model. For example, by relaxing the uniform specification current requirement on each circuit element, the Joule heating of an integrated circuit design is estimated more accurately, and the operating speeds of the integrated circuit design and the reliability lifetime of the design can be further increased. In some embodiments, the Joule heating of an integrated circuit design is estimated from a current value for each corresponding circuit element, where each current value is capable of being different from one another. In some embodiments, the current value for some circuit elements are set at a value that is higher than other elements in the integrated circuit design resulting in a more accurate Joule heating model than the pessimistic Joule heating model, but with a same desired limit on the temperature change $\Delta T$. In some embodiments, the Joule heating of an integrated circuit design is estimated by adjusting the individual current value of each corresponding circuit element from a local power density of each corresponding circuit element. In some embodiments, the Joule heating of an integrated circuit design is estimated by the use of a power index (as described herein by formula 2A).

FIG. 1A is a schematic view of an integrated circuit design 100 in accordance with some embodiments. Integrated circuit design 100 includes circuit elements 104, 106, 108 and 110. The integrated circuit design 100 has electrical characteristics associated with circuit elements 104, 106, 108 and 110. The electrical characteristics include measured or calculated values of current I, resistance R, capacitance C, inductance L and the like.

For example, circuit element 104 has an equivalent resistance represented by R1, and an RMS current value represented by $I_{rms1}$. Circuit element 106 has an equivalent resistance represented by R2, and an RMS current value represented by $I_{rms2}$. Circuit element 108 has an equivalent resistance represented by R3, and an RMS current value represented by $I_{rms3}$. Circuit element 110 has an equivalent resistance represented by R4, and an RMS current value represented by $I_{rms4}$.

The electrical characteristics of the circuit elements are sufficient to measure, calculate or approximate through calculation, power loss in a circuit element (e.g., circuit element 104, 106, 108 or 110) in an integrated circuit design. For example, in a simple circuit design, formula 1 provides an approximation for the power loss of a circuit element.

$$\text{Power Loss}=I^2*R \quad (1)$$

where Power Loss is the ohmic power loss of a circuit element, I is the current through a circuit element and R is the equivalent resistance of the circuit element.

As shown in formula 1, the power loss of the circuit element is proportional to the Joule heating of the circuit element. In some embodiments, the approximation for the power loss of a circuit element is determined for each of the circuit elements (e.g., circuit element 104, 106, 108 or 110) in the integrated circuit design 100 in order to obtain an objective parameter for checking the Joule heating of the entire integrated circuit design 100. For example, from the power loss calculation shown in formula 1 (above), which is sometimes based on measurement or theoretically approximate values for current I, resistance R, capacitance C, inductance L and the like, one could define various power indexes (as described herein by formula 2A) which correlate with the Joule heating of integrated circuit design 100.

Figure 1B:
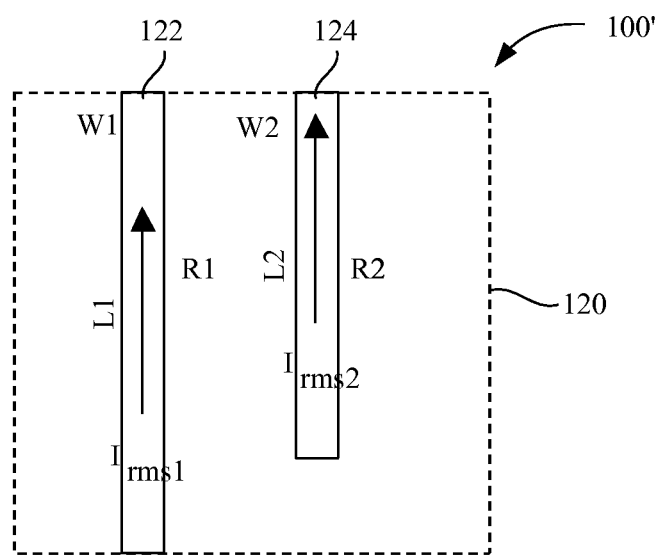
FIG. 1B is a schematic view of an integrated circuit design in accordance with some embodiments.

FIG. 1B is a schematic view of an integrated circuit design 100' in accordance with some embodiments. Integrated circuit design 100' is an embodiment of integrated circuit design 100 shown in FIG. 1A with similar elements. Window 120 is a portion of integrated circuit design 100 shown in FIG. 1A with similar elements. Circuit element 122 is an embodiment of circuit element 104 shown in FIG. 1A with similar elements. Circuit element 124 is an embodiment of circuit element 106 shown in FIG. 1A with similar elements.

Integrated circuit design 100' includes window 120, and circuit elements 122 and 124.

Circuit elements 122 and 124 are located within window 120. In some embodiments, a window is a portion of at least one circuit element in an integrated circuit design. Circuit element 122 has an equivalent resistance represented by R1, and an RMS current value represented by $I_{rms1}$. Circuit element 122 has a length L1, and a width W1.

Circuit element 124 has an equivalent resistance represented by R2, and an RMS current value represented by $I_{rms2}$. Circuit element 124 has a length L2, and a width W2.

In some embodiments, the power index is a numerical value that is a function of a power density of the one or more circuit elements within a corresponding window. In some embodiments, the power index is determined by formula 2A.

The power index, P, of a window is expressed by formula 2A:

$$P=\Sigma(L/W)*I_{rms}^2 \quad (2A)$$

where P is the power index of the corresponding window, L is the length of a circuit element in the corresponding window, W is the width of a circuit element in the corresponding window, and $I_{rms}$ is the RMS current value through a circuit element within the corresponding window.

For example, an application of Formula 2A to the window 120 shown in FIG. 1B results in power index, P1, expressed by formula 2B:

$$P1=(L1/W1)*I_{rms1}^2+(L2/W2)*I_{rms2}^2 \quad (2B)$$

where P1 is the power index of window 120, L1 is the length of circuit element 122 in window 120, L2 is the length of circuit element 124 in window 120, W1 is the width of circuit element 122 in window 120, W2 is the width of circuit element 124 in window 120, $I_{rms1}$ is the RMS current value through circuit element 122, and $I_{rms2}$ is the RMS current value through circuit element 124.

In some embodiments, the power index of a window is a function of the geometry of the one or more circuit elements within the corresponding window. In some embodiments, the power index is a function of a resistance of the one or more circuit elements within the corresponding window. In some embodiments, the power index associated with a corresponding window is a function of the current value associated with the corresponding window. In some embodiments, the geometry of one or more circuit elements includes the length of the one or more circuit elements, and the width of the one or more circuit elements.

Figures 5, 6:
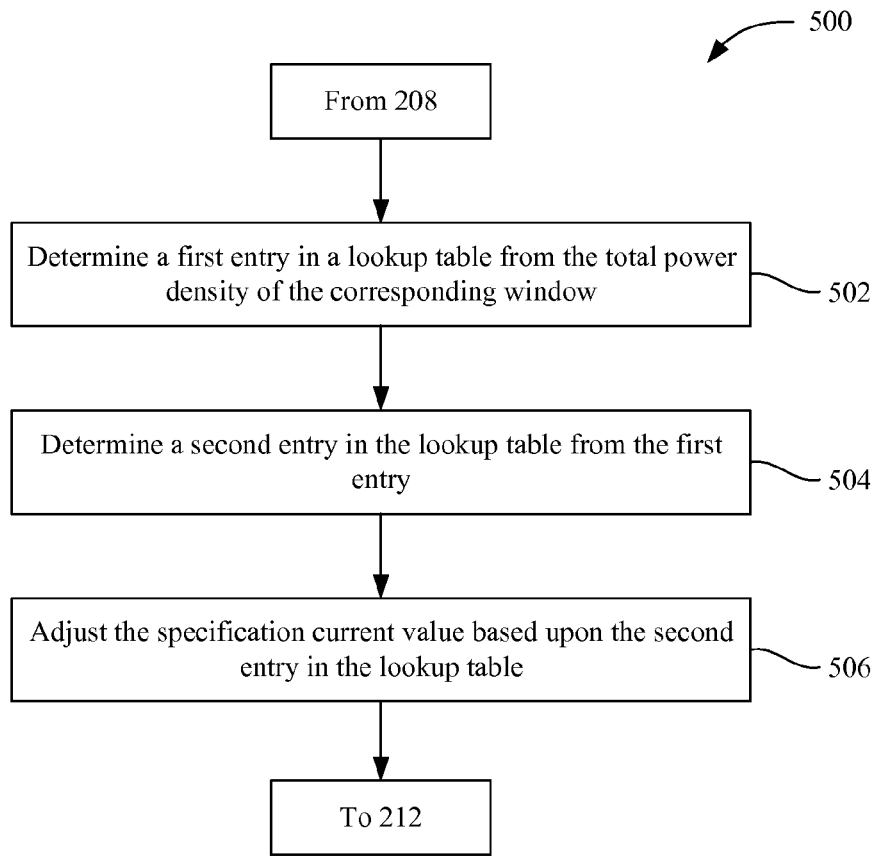
FIG. 5 is a flow chart of a method of adjusting the specification current value associated with each of the corresponding windows in an integrated circuit design in accordance with some embodiments.
FIG. 6 is a lookup table in accordance with some embodiments.

In some embodiments, the power index is a numerical value that is a function of a total power density of the one or more circuit elements within the corresponding window (as shown in Table 600 of FIG. 6). In some embodiments, the total power density of the one or more circuit elements within the corresponding window is expressed by formula 4 herein. In some embodiments, determining the power index of each window includes determining a total power density of each window, where each total power density is associated with a corresponding window.

Figure 2A:
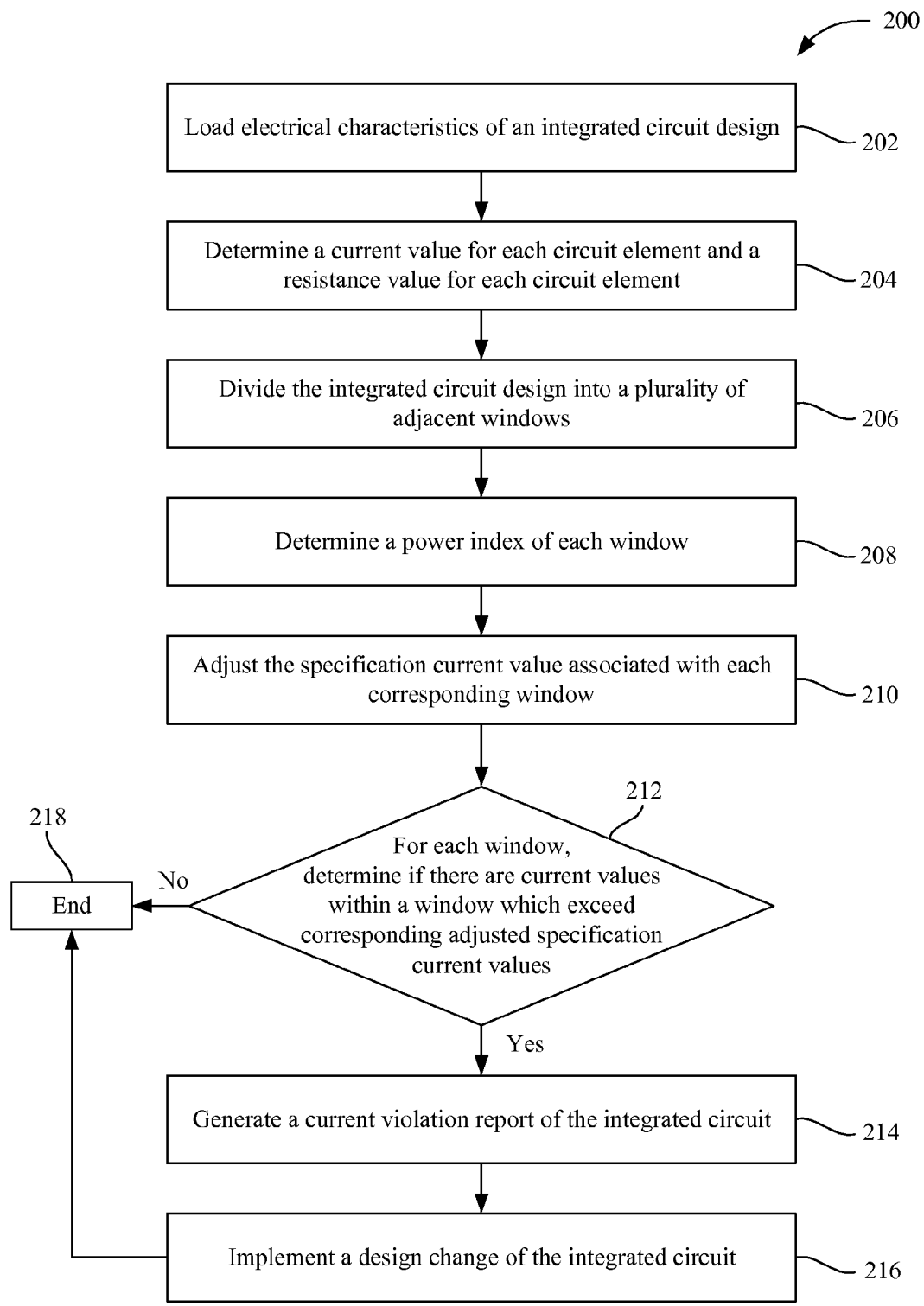
FIG. 2A is a flow chart of a method of checking joule heating of an integrated circuit in accordance with some embodiments.

FIG. 2A is a flow chart of a method 200 of checking joule heating of an integrated circuit in accordance with some embodiments. In some embodiments, the method 200 is implemented as a software application comprising computer program code for execution by a processor that is used by an EDA tool. Method 200 begins with operation 202, in which a system for checking joule heating of an integrated circuit design loads electrical characteristics of an integrated circuit design. In some embodiments, the electrical characteristics include resistance network information of the components in the integrated circuit design. In some embodiments, the electrical characteristics include capacitance network information of the components in the integrated circuit design. In some embodiments, the electrical characteristics include resistance-capacitance (RC) network information of the components in the integrated circuit design. In some embodiments, the electrical characteristics include inductance (L) network information of the components in the integrated circuit design. In some embodiments, the electrical characteristics include current waveform information of the components in the integrated circuit design. In some embodiments, the electrical characteristics include specification current values for each circuit element in the integrated circuit design. In some embodiments, the specification current value of a circuit element is a design threshold or a design limit on the RMS current value through the corresponding circuit element to prevent overheating. In some embodiments, the specification current value of a circuit element is limited by the desired temperature change ΔT between the substrate of the integrated circuit design and the corresponding circuit elements. In some embodiments, the specification current value of a circuit element is the design current value of a corresponding circuit element. In some embodiments, the electrical characteristics include voltage information of the components in the integrated circuit design or other similar information. In some embodiments, the electrical characteristics of the components in the integrated circuit design are extracted from a database file of the design layout. In some embodiments, the RC network information or the current waveform information of the components in the integrated circuit design is extracted from a database file of the design layout. In some embodiments, the integrated circuit design is a layout. In some embodiments, the layout is generated as a Graphic Database System (GDS) file (e.g., a GDSII file). In some embodiments, the layout includes a database file comprising various layers that are drawn to represent the integrated circuit. In some embodiments, a circuit element is a conductive material. In some embodiments, a circuit element is a metal material.

In operation 204, the system for checking joule heating of an integrated circuit design determines a current value for each circuit element in the integrated circuit design, and determines a resistance value for each circuit element in the integrated circuit design. The integrated circuit design includes one or more circuit elements. A circuit element is a portion of a circuit. In some embodiments, each circuit element is associated with a corresponding resistance. In some embodiments, each circuit element is associated with a corresponding current value. In some embodiments, the resistance value of each corresponding circuit element is determined from the extracted RC network data. In some embodiments, the current value of each corresponding circuit element is determined from the current waveform information of each of the components in the integrated circuit design. In some embodiments, the current value is a root mean square (RMS) alternating current (AC) value. In some embodiments, the extracted RC network data and the current waveform information are sufficient to calculate a power of each circuit element in the integrated circuit design.

In operation 206, the system for checking joule heating of an integrated circuit design divides the integrated circuit design into a plurality of adjacent windows. In some embodiments, each window includes a portion of one or more circuit elements. In some embodiments, each circuit element of the one or more circuit elements is associated with a corresponding current value within the window. In some embodiments, each window is associated with one or more corresponding current values. In some embodiments, each window is associated with a corresponding specification current value. In some embodiments, each window is associated with both a corresponding current value and a corresponding specification current value. In some embodiments, the specification current value is the current value associated with a corresponding window in a design specification. In some embodiments, the specification current value is the current value of a circuit element in a design specification within the corresponding window. In some embodiments, the specification current value is an RMS current value. In some embodiments, an adjacent window is a window within a predetermined distance of other windows.

In some embodiments, the shape of each window is a polygon. In some embodiments, the size of two or more windows is the same. In some embodiments, the sizes of two or more windows are different. In some embodiments, two or more of the windows overlap by the use of a step size. In some embodiment, each window has a rectangular shape having a height H and a width W. The windows in one row are spaced a distance X apart, where X ranges from W/4 to W. The windows in the columns are spaced a distance Y apart, where Y ranges from H/4 to H. In some embodiments, other shapes and step sizes are envisioned. In some embodiments, the height H ranges from 1 micrometer (μm) to 100 μm. In some embodiments, the width W ranges from 1 μm to 100 μm. In some embodiments, other sizes and shapes are envisioned. In some embodiments, the height H and the width W are chosen to a desired degree sufficient to reveal a desired local heating resolution.

In operation 208, the system for checking joule heating of an integrated circuit design determines a power index of each window from the current value associated with one or more circuit elements within the window. In some embodiments, operation 208 is performed for each window in the integrated circuit design. In some embodiments, the power index is determined by formula 2A. In some embodiments, each power index is associated with a corresponding window. In some embodiments, the power index is a numerical value that is a function of a power density of the one or more circuit elements within the corresponding window. In some embodiments, each power index is associated with a plurality of corresponding windows.

In operation 210, the system for checking joule heating of an integrated circuit design adjusts the specification current value associated with each of the corresponding windows. In some embodiments, operation 210 is performed for each window in the integrated circuit design. In some embodiments, an amount of adjustment of the specification current value is a function of the power index associated with the corresponding window. In some embodiments, an amount of adjustment of the specification current value is a function of the power index associated with the corresponding window. In some embodiments, adjustment of the specification current value comprises increasing the specification current value. In some embodiments, adjustment of the specification current value comprises decreasing the specification current value. In some embodiments, the specification current values for each circuit element in the integrated circuit design are loaded into the EDA tool in operation 210.

In operation 212, the system for checking joule heating of an integrated circuit design determines if there are current values associated with the one or more circuit elements within a corresponding window which exceeds a corresponding adjusted specification current value within the corresponding window. In some embodiments, operation 212 is performed for each window in the integrated circuit design. If the system for checking joule heating of an integrated circuit design determines a current value associated with the one or more circuit elements within the corresponding window exceeds the corresponding adjusted specification current value of the corresponding window, the operation proceeds to 214. If the system for checking joule heating of an integrated circuit design determines that for each of the windows, each of the current values associated with the one or more circuit elements within the corresponding window does not exceed the corresponding adjusted specification current value of the corresponding window, the operation ends.

In operation 214, the system for checking joule heating of an integrated circuit design generates a current violation report of the integrated circuit. The current violation report includes one or more entries. Each entry of the one or more entries is associated with both a corresponding window and one or more corresponding current values associated with one or more circuit elements within the corresponding window which exceed the corresponding adjusted specification current value of the corresponding window. In some embodiments, the current violation report includes a location of each window associated with the violation. In some embodiments, the current violation report includes, for each window associated with a violation, a width of the one or more circuit elements within the corresponding window.

In operation 216, the system for checking joule heating of an integrated circuit design implements a design change of the integrated circuit from the current violation report. In some embodiments, a design change includes changing the width of one or more circuit elements in the integrated circuit. In some embodiments, changing the width of one or more circuit elements includes increasing the width of one or more circuit elements to lower the resistance of the one or more circuit elements and allowing a same amount of RMS current in the one or more circuit elements even with the design change. In some embodiments, a design change includes changing the position of one or more circuit elements the integrated circuit. In some embodiments, a design change includes changing the width of the integrated circuit design. In some embodiments, a design change includes changing the length of the integrated circuit design. In some embodiments, a design change includes changing the amplitude of one or more AC driving currents in one or more circuit elements of the integrated circuit design. In some embodiments, changing the amplitude of one or more AC driving currents in one or more circuit elements includes reducing the amplitude of the one or more AC driving currents. In some embodiments, a design change includes reducing the speed of one or more AC driving currents in the one or more circuit elements of the integrated circuit design.

In operation 218, the system for checking joule heating of an integrated circuit design ends. In some embodiments, the system for checking joule heating of an integrated circuit design implements a design change of the integrated circuit even though a current violation report was not generated in operation 216. In some embodiments, in operation 218, the system for checking joule heating of an integrated circuit design implements one or more of the design changes discussed in operation 216. In some embodiments, the design change of the integrated circuit includes changing the width of the integrated circuit design. In some embodiments, a design change includes changing the length of the integrated circuit design. In some embodiments, a design change includes changing the amplitude of one or more driving currents of the integrated circuit design.

Figure 2B:
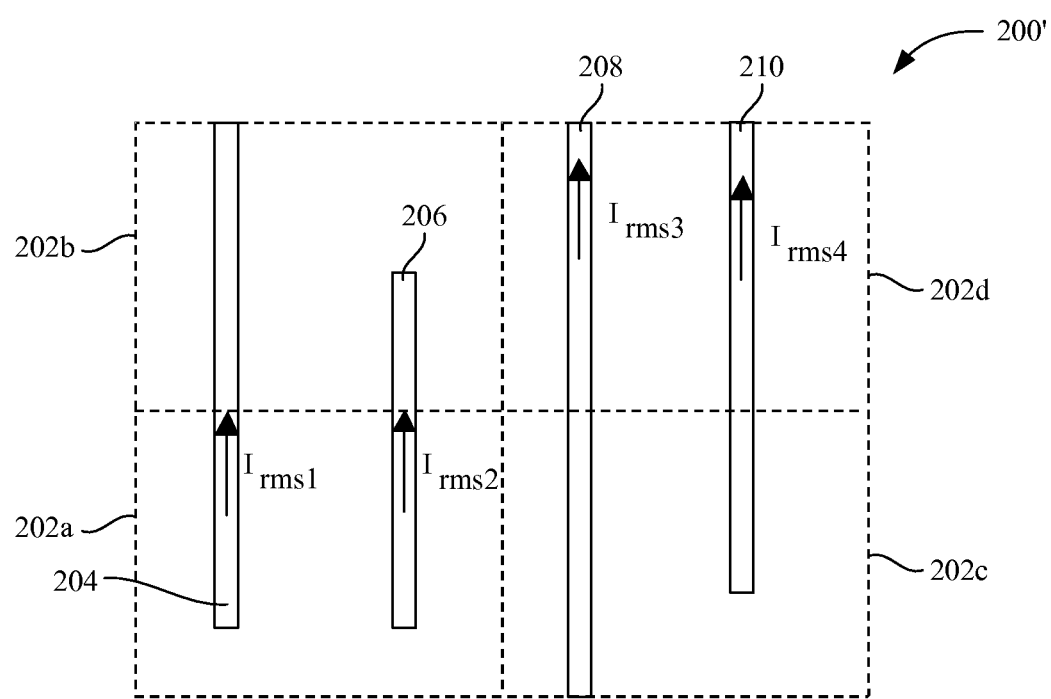
FIG. 2B is a schematic view of an integrated circuit design in accordance with some embodiments.

FIG. 2B is a schematic view of an integrated circuit design 200' in accordance with some embodiments. Integrated circuit design 200' is an embodiment of integrated circuit design 100 after operation 206 of method 200 in FIG. 2A. Integrated circuit design 200' includes windows 202a, 202b, 202c and 202d, and circuit elements 204, 206, 208 and 210. Circuit element 204 is an embodiment of circuit element 104 shown in FIG. 1A with similar elements. Circuit element 206 is an embodiment of circuit element 106 shown in FIG. 1A with similar elements. Circuit element 208 is an embodiment of circuit element 108 shown in FIG. 1A with similar elements. Circuit element 210 is an embodiment of circuit element 110 shown in FIG. 1A with similar elements.

Integrated circuit design 200' is divided into a plurality of windows (e.g., windows 202a, 202b, 202c and 202d). In some embodiments, each window includes a portion of one or more circuit elements. The circuit elements 204, 206, 208 and 210 are located within windows 202a, 202b, 202c or 202d. Circuit element 204 is located within windows 202a and 202b. Circuit element 206 is located within windows 202a and 202b. Circuit element 208 is located within windows 202c and 202d. Circuit element 210 is located within windows 202c and 202d.

In some embodiments, the shape of each window (e.g., 202a, 202b, 202c or 202d) is a polygon. In some embodiments, the size of two or more windows (e.g., 202a, 202b, 202c or 202d) is the same. In some embodiments, the sizes of two or more windows (e.g., 202a, 202b, 202c or 202d) are different. In some embodiments, two or more of the windows (e.g., 202a, 202b, 202c or 202d) overlap by the use of a step size. The step size is an amount of overlap of two or more windows. In some embodiments, the size of a window ranges from about 1 µm to about 100 µm. In some embodiments, the size of a step size ranges from about 1 µm to about 100 µm.

Figure 3:
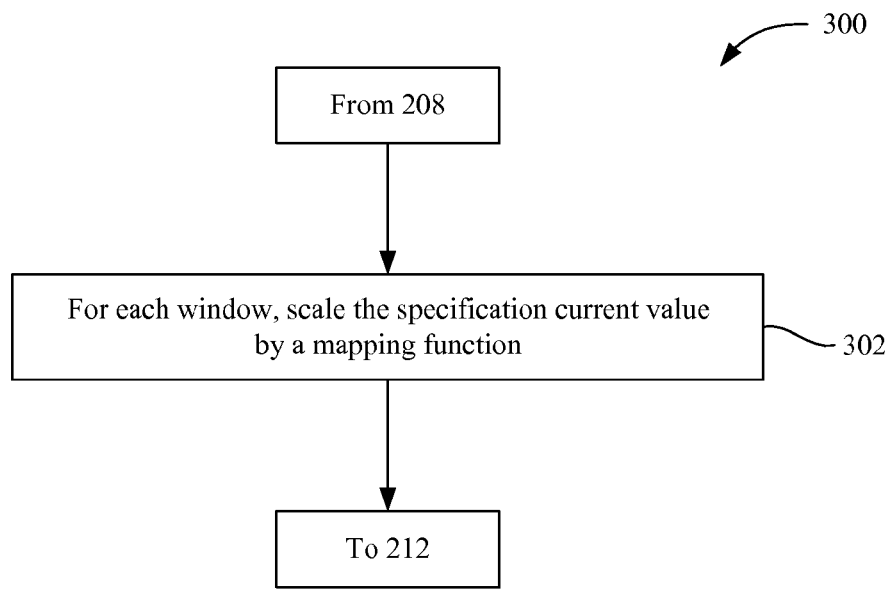
FIG. 3 is a flow chart of a method of adjusting the specification current value associated with each of the corresponding windows in an integrated circuit design in accordance with some embodiments.

FIG. 3 is a flow chart of a method 300 of adjusting the specification current value associated with each of the corresponding windows in an integrated circuit design in accordance with some embodiments. Method 300 is an embodiment of operation 210 shown in FIG. 2A with similar elements. Method 300 begins with operation 302 in which the system for checking joule heating of an integrated circuit design scales the specification current value, $I_{RMS0}$, associated with the corresponding window by a mapping function. In some embodiments, the mapping function is expressed by formula 3. In some embodiments, operation 302 is performed for each window in the integrated circuit design. In some embodiments, the mapping function is a function of the power index (as expressed by formula 2A) associated with each of the corresponding windows. In some embodiments, the mapping function is a function of the power density (as expressed by table 1) associated with each of the corresponding windows. In some embodiments, the mapping function is a function of the initial specification current, $I_{RMS0}$, associated with each of the corresponding windows.

In some embodiments, the adjusted specification current value of a corresponding window, $I_{RMS}$, is expressed by formula 3:

$$I_{RMS} = (P0/P)^{0.5} * I_{RMS0} \quad (3)$$

where $I_{RMS}$ is the adjusted specification current value of the corresponding window, P0 is the initial power index of the corresponding window, P is the power index of the corresponding window (as expressed by formula 2A) and $I_{RMS0}$ is the initial specification current value for each of the windows. In some embodiments, the adjusted specification current $I_{RMS}$ associated with each of the corresponding windows is equal to the initial specification current value $I_{RMS0}$ associated with each of the corresponding windows. In some embodiments, the initial power index P0 of the corresponding window is a specification power index of the corresponding window determined from formula 2A using the specification current value $I_{RMS0}$ as the current value through each of the circuit elements within the corresponding window. In some embodiments, the initial power index P0 of the corresponding window is an initial specification power index of the corresponding window which is also loaded in operation 202 as part of the electrical characteristics of an integrated circuit design.

Figure 4:
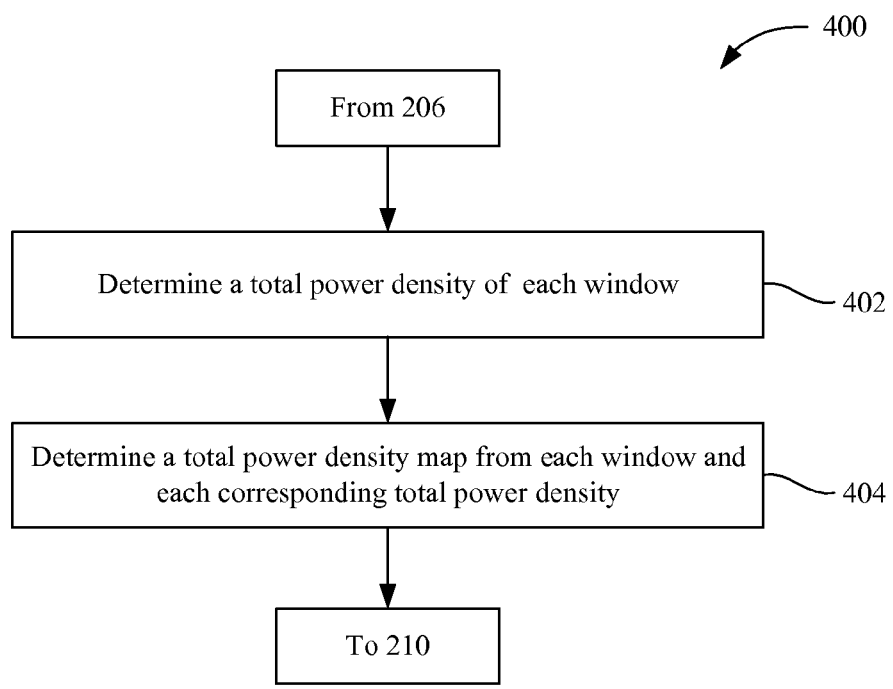
FIG. 4 is a flow chart of a method of determining a power index of each window in an integrated circuit design in accordance with some embodiments.

FIG. 4 is a flow chart of a method 400 of determining a power index of each window in an integrated circuit design in accordance with some embodiments. Method 400 is an embodiment of operation 208 shown in FIG. 2A. Method 400 begins with operation 402 in which the system for checking joule heating of an integrated circuit design determines a total power density of each window. In some embodiments, operation 402 is performed for each window in the integrated circuit design. In some embodiments, each total power density is associated with a corresponding window. In some embodiments, each total power density is associated with a plurality of corresponding windows. In some embodiments, the total power density is determined by formula 4. In some embodiments, the total power density is a function of the power index of the one or more circuit elements within the corresponding window. In some embodiments, the total power density of each window is a function of the RMS current value through the one or more circuit elements within the corresponding window. In some embodiments, the total power density of each window is a function of the equivalent resistance of the one or more circuit elements within the corresponding window. In some embodiments, the total power density is the total power of each of the one or more circuit elements within the corresponding window.

The total power density, PD, of each corresponding window is expressed by formula 4:

$$PD = \Sigma(R) * I_{rms}^2 \quad (4)$$

where PD is the total power density of each of the circuit elements within the corresponding window, R is the equivalent resistance of a circuit element in the corresponding window, and $I_{rms}$ is the RMS current value through the circuit element. Formula 4 is summed for each of the circuit elements within a corresponding window.

In operation 404, the system for checking joule heating of an integrated circuit design determines a power density map from both each window and each corresponding total power density. In some embodiments, operation 404 is performed for each window in the integrated circuit design. In some embodiments, each window is associated with a corresponding coordinate location. In some embodiments, the power density map comprises the coordinate location of each window, and the corresponding total power density of each window. In some embodiments, the power density map comprises the coordinate location of each window, and the corresponding power index of each window. In some embodiments, the power density map comprises the coordinate location of each window, and the corresponding specification current value.

In some embodiments, the power density map comprises the coordinate location of each window, each of the circuit elements within each corresponding window, and each of the corresponding current values within each corresponding window. In some embodiments, the power density map comprises the coordinate location of each window, and each of the equivalent resistance values of each corresponding circuit element within each corresponding window.

In some embodiments, an application of formula 4 (described in operation 402) to the window 120 (shown in FIG. 1B) results in a total power density PD1 expressed by formula 4A:

$$PD1 = (R1) * I_{rms1}^2 + (R2) * I_{rms2}^2 \quad (4A)$$

where PD1 is the total power density of window 120, R1 is the equivalent resistance of circuit element 122 in window 120, R2 is the equivalent resistance of circuit element 124 in window 120, $I_{rms1}$ is the RMS current value through circuit element 122, and $I_{rms2}$ is the RMS current value through circuit element 124.

FIG. 5 is a flow chart of a method 500 of adjusting the specification current value associated with each of the corresponding windows in an integrated circuit design in accordance with some embodiments. Method 500 is an embodiment of operation 210 shown in FIG. 2A. In some embodiments, the operations of method 500 (e.g., operations 502, 504 and 506) are repeated for each of the windows within the integrated circuit design. In some embodiments, the operations of method 500 (e.g., operations 502, 504 and 506) are performed utilizing the total power density value of each window within the integrated circuit design as determined in operation 402 of method 400. Method 500 begins with operation 502 in which the system for checking joule heating of an integrated circuit design determines a first entry in a lookup table from a total power density of the corresponding window. In some embodiments, the first entry comprises a range of total power densities for a corresponding window. In some embodiments, the lookup table comprises a first entry and a second entry. In some embodiments, method 500 is utilized with a lookup table similar to that shown in FIG. 6.

In operation 504, the system for checking joule heating of an integrated circuit design determines a second entry in the lookup table from the first entry in the lookup table. The second entry is associated with a corresponding first entry. In some embodiments, the second entry contains an adjusted specification current value for the corresponding window. In some embodiments, the adjusted specification current value is a function of the specification current value for the corresponding window.

In operation 506, the system for checking joule heating of an integrated circuit design adjusts a specification current value based on the second entry in the lookup table. In some embodiments, the total power density of the corresponding window is increased. In some embodiments, the total power density of the corresponding window is decreased.

In some embodiments, if the first entry in the lookup table is greater than or equal to a threshold, the total power density is not adjusted (e.g., as shown in entry 602a of lookup table 600 shown in FIG. 6) by operation 506 or operation 210. In some embodiments, if the first entry in the lookup table is less than a threshold, the total power density is adjusted (e.g., as shown in entries 602b-602d of lookup table 600 shown in FIG. 6) by operation 506 or operation 210. While method 500 utilized a lookup table (e.g., lookup table 600 in FIG. 6) including several ranges of total power densities in each of the corresponding windows in an integrated circuit design, other embodiments exist where the specification current value associated with each of the windows is adjusted based upon the power index of the window, the current values of the one or more circuit elements in the window or the equivalent resistance values of the one or more circuit elements in the window.

While method 500 utilized a lookup table (e.g., lookup table 600 in FIG. 6) including several ranges of total power densities in each of the corresponding windows in an integrated circuit design, other embodiments exist where a relationship between the total power density and the adjusted specification current value associated with each of the windows is expressed as an equation. In these embodiments, the specification current value associated with each of the windows is adjusted based upon the equation. For example, in some embodiments, the relationship between the total power density and the adjusted specification current value associated with each of the windows is expressed as a step function with a number of ranges, and corresponding total power densities over each of the ranges. For example, in some embodiments, the relationship between the total power density and the adjusted specification current value associated with each of the windows is expressed as a polynomial function or an exponential function.

In some embodiments, method 500 is utilized with a lookup table similar to that shown in FIG. 6. In some embodiments, the contents of the lookup table (e.g., lookup table 600 in FIG. 6) utilized in method 500 are varied. For example, in some embodiments, the contents of the lookup table include different ranges of the total power index of each window in an integrated circuit design, and the corresponding method 500 which utilizes the lookup table adjusts the specification current value associated with each of the windows based upon the power index of the window consistent with the teachings herein. For example, in some embodiments, the contents of the lookup table include different ranges of the current of the one or more elements in each window in an integrated circuit design, and the corresponding method 500 which utilizes the lookup table adjusts the specification current value associated with each of the windows based upon the current values of the one or more circuit elements in the window consistent with the teachings herein. For example, in some embodiments, the contents of the lookup table include different ranges of the resistances of the one or more elements in each window in an integrated circuit design, and the corresponding method 500 which utilizes the lookup table adjusts the specification current value associated with each of the windows based upon the equivalent resistance values of the one or more circuit elements in the window consistent with the teachings herein.

FIG. 6 is a lookup table 600 in accordance with some embodiments. Lookup table 600 comprises 5 rows and 2 columns. The first column comprises a plurality of first entries (e.g., first entry 602a, 602b, 602c and 602d). The second column comprises a plurality of second entries (e.g., second entry 602a, 602b, 602c and 602d). In some embodiments, method 500 is utilized with a lookup table similar to that shown in FIG. 6.

First entry 602a comprises a range of total power densities (e.g., $PD \geq P_{spec1}$) associated with a corresponding window, where $P_{spec1}$ is a first specification total power density of the corresponding window. First entry 602b comprises a range of total power densities (e.g., $P_{spec1} > PD \geq P_{spec2}$) associated with a corresponding window, where $P_{spec2}$ is a second specification total power density of the corresponding window. First entry 602c comprises a range of total power densities (e.g., $P_{spec2} > PD \geq P_{spec3}$) associated with a corresponding window, where $P_{spec3}$ is a third specification total power density of the corresponding window. First entry 602d comprises a range of total power densities (e.g., $PD < P_{spec3}$) associated with a corresponding window. In some embodiments, the first specification total power density $P_{spec1}$, the second specification total power density $P_{spec2}$ or the third specification total power density $P_{spec3}$ are determined from formula 4A using the specification current value $I_{rms0}$ for the RMS current value $I_{rms}$ of each circuit element within the corresponding window.

Second entry 604a comprises an adjusted specification current $I_{RMS}$ (e.g., $C1*I_{RMS0}$, where C1 is a real number) associated with the range of total power densities (e.g., $PD \geq P_{spec1}$) defined by first entry 602a. Second entry 604b comprises an adjusted specification current $I_{RMS}$ (e.g., $C2*I_{RMS0}$, where C2 is a real number) associated with the range of total power densities (e.g., $P_{spec1} > PD \geq P_{spec2}$) defined by first entry 602b. Second entry 604c comprises an adjusted specification current $I_{RMS}$ (e.g., $C3*I_{RMS0}$, where C3 is a real number) associated with the range of total power densities (e.g., $P_{spec2} > PD \geq P_{spec3}$) defined by first entry 602c. Second entry 604d comprises an adjusted specification current $I_{RMS}$ (e.g., $C4*I_{RMS0}$, where C4 is a real number) associated with the range of total power densities (e.g., $PD < P_{spec3}$) defined by first entry 602d.

In some embodiments, C1 is substantially equal to 1. In some embodiments, C1 ranges from 0.8 to 1.2. In some embodiments, C2 ranges from 1.0 to 1.8. In some embodiments, C3 ranges from 1.6 to 2.4. In some embodiments, C4 ranges from 2.4 to 3.2. In some embodiments, the value of C1, C2, C3, and C4 depend on the specification current value IRMS0. In some embodiments, the value of C4 ranges from about 5*C1 to about 20*C1. In some embodiments, C2 is greater than C1 (e.g., C1<C2). In some embodiments, C3 is greater than C1 (e.g., C1<C3). In some embodiments, C3 is less than or equal to C4 (e.g., C3≤C4). In some embodiments, C2 is less than or equal to C4 (e.g., C2≤C4). In some embodiments, C3 is greater than or equal to C2 (e.g., C2≤C3).

In some embodiments, if the total power density PD of a corresponding window is within the range defined by the first entry 602a (e.g., $PD \geq P_{spec1}$), the adjusted specification current value $I_{RMS}$ of the corresponding window corresponds to the value in the second entry 604a (e.g., $C1*I_{RMS0}$). In this embodiment, the adjusted specification current value $I_{RMS}$ of the corresponding window corresponds to the current specification value $I_{RMS0}$ of the corresponding window. In this embodiment, the current specification value $I_{RMS0}$ of the corresponding window is not adjusted.

In some embodiments, if the total power density PD of a corresponding window is within the range defined by the first entry 602b (e.g., $P_{spec1} > PD \geq P_{spec2}$), the adjusted specification current value $I_{RMS}$ of the corresponding window corresponds to the value in the second entry 604b (e.g., $C2*I_{RMS0}$). In this embodiment, the adjusted specification current value of the corresponding window $I_{RMS}$ is substantially equal to $C2*I_{RMS0}$. In this embodiment, the current specification value of the corresponding window $I_{RMS0}$ is adjusted.

In some embodiments, if the total power density PD of a corresponding window is within the range defined by the first entry 602c (e.g., $P_{spec2} > PD \geq P_{spec3}$), the adjusted specification current value of the corresponding window $I_{RMS}$ corresponds to the value in the second entry 604c (e.g., $C3*I_{RMS0}$). In this embodiment, the adjusted specification current value of the corresponding window $I_{RMS}$ is substantially equal to $C3*I_{RMS0}$. In this embodiment, the current specification value of the corresponding window $I_{RMS0}$ is adjusted.

In some embodiments, if the total power density PD of a corresponding window is within the range defined by the first entry 602d (e.g., $PD < P_{spec3}$), the adjusted specification current value of the corresponding window $I_{RMS}$ corresponds to the value in the second entry 604d (e.g., $C4*I_{RMS0}$). In this embodiment, the adjusted specification current value of the corresponding window $I_{RMS}$ is substantially equal to $C4*I_{RMS0}$. In this embodiment, the current specification value of the corresponding window $I_{RMS0}$ is adjusted.

Figure 7A:
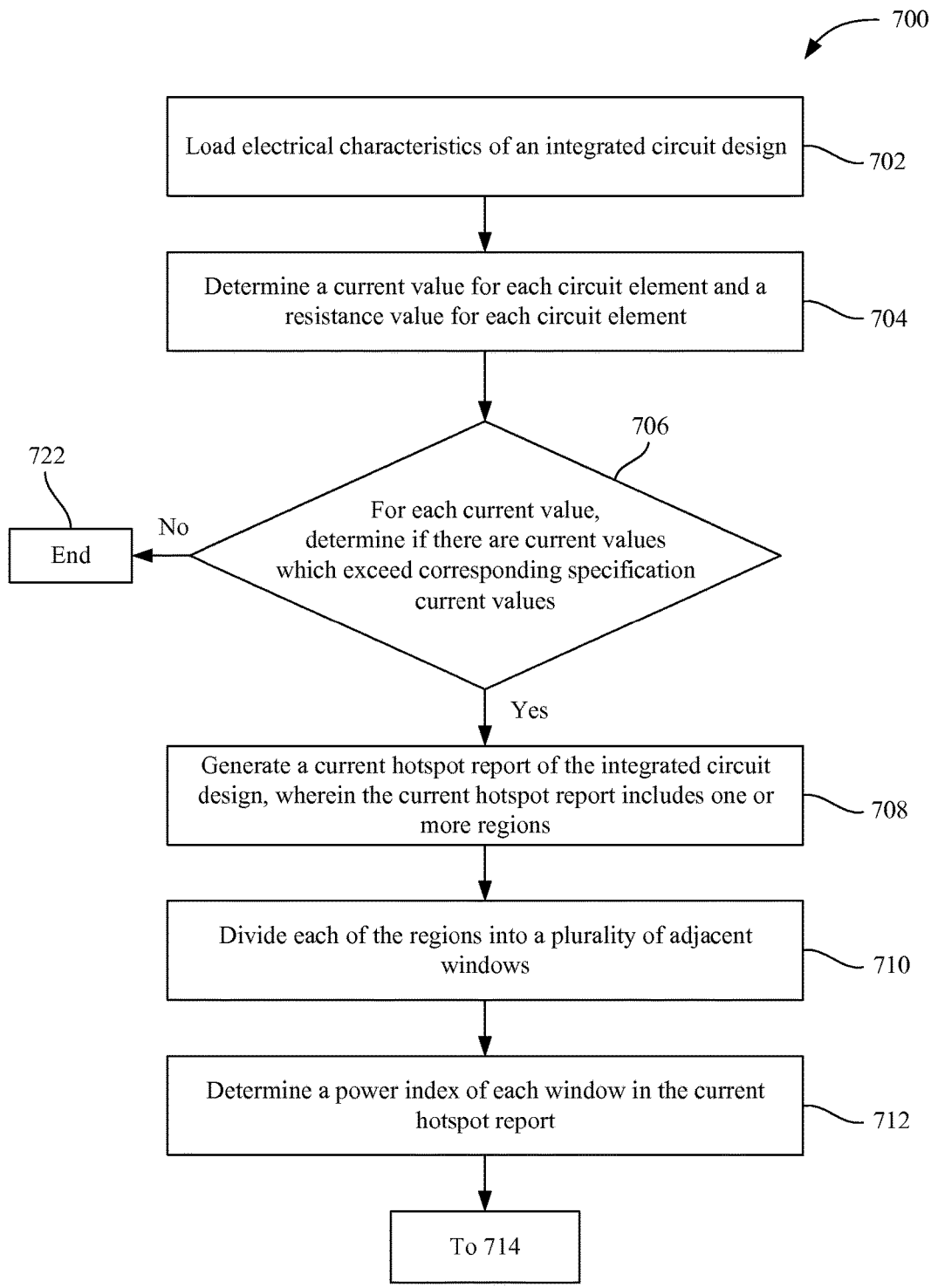
FIG. 7A is a flow chart of a method of checking joule heating of an integrated circuit in accordance with some embodiments.
Figure 7B:
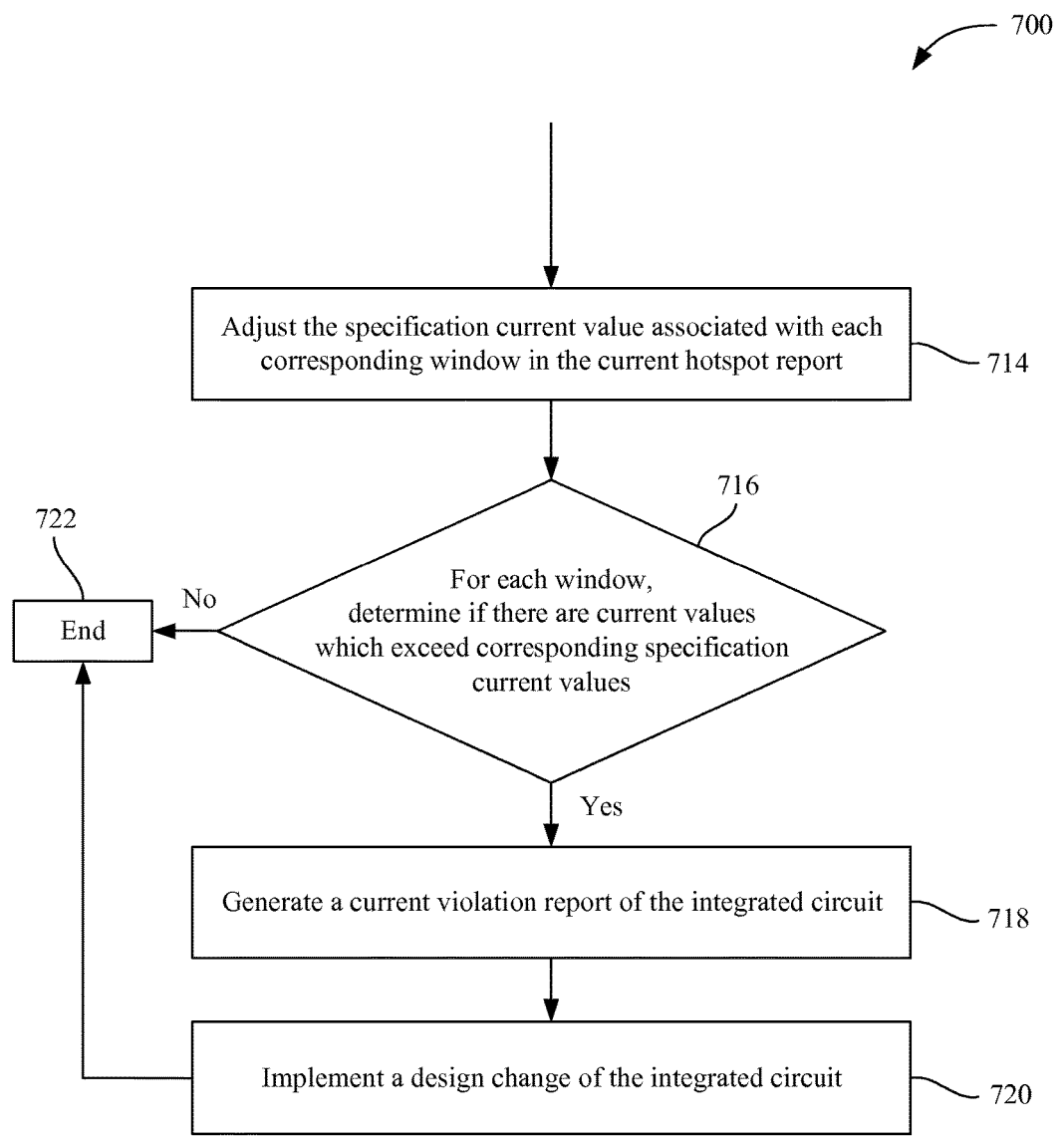
FIG. 7B is a flow chart of a method of checking joule heating of an integrated circuit in accordance with some embodiments.

FIGS. 7A-7B are a flow chart of a method 700 of checking joule heating of an integrated circuit in accordance with some embodiments. In some embodiments, the method 700 is implemented as a software application comprising computer program code for execution by a processor that is used by an EDA tool. Method 700 is an embodiment of the method 200 shown in FIG. 2A with similar operations. Method 700 begins with operation 702, in which a system for checking joule heating of an integrated circuit design loads electrical characteristics of an integrated circuit design. In some embodiments, the electrical characteristics include RLC network information of the components in the integrated circuit design. In some embodiments, the electrical characteristics include current waveform information of the components in the integrated circuit design. In some embodiments, operation 702 is an embodiment of operation 202 shown in FIG. 2A with similar features.

In operation 704, the system for checking joule heating of an integrated circuit design determines a current value for each circuit element in the integrated circuit design, and determines a resistance value for each circuit element in the integrated circuit design. In some embodiments, operation 704 is an embodiment of operation 204 shown in FIG. 2A with similar features.

In operation 706, the system for checking joule heating of an integrated circuit design determines if there are current values for each corresponding circuit element which exceed a corresponding specification current value for the corresponding circuit element. In some embodiments, each current value of a circuit element is associated with a corresponding specification current value of the circuit element. In some embodiments, the specification current value is associated with a corresponding circuit element. In some embodiments, operation 706 is performed for each circuit element in the integrated circuit design. If the system for checking joule heating of an integrated circuit design determines a current value for a corresponding circuit element exceeds the corresponding specification current value of the circuit element, the operation proceeds to 708. If the system for checking joule heating of an integrated circuit design determines that each of the current values for each corresponding circuit element do not exceed the corresponding specification current value of the circuit element, the operation proceeds to operation 722.

In operation 708, the system for checking joule heating of an integrated circuit design generates a current hotspot report of the integrated circuit design. The current hotspot report includes one or more regions. Each region of the one or more regions is associated with both a corresponding circuit element and a corresponding current value of the circuit element which exceeds the corresponding specification current value. A hotspot is a region where the corresponding current value of a circuit element exceeds the corresponding specification current value of the circuit element. In some embodiments, the current hotspot report includes a location of each circuit element associated with the corresponding region. In some embodiments, the current hotspot report includes, for each circuit element associated with the corresponding region, a width of the circuit elements. In some embodiments, the current hotspot report includes, for each circuit element associated with the corresponding region, a resistance of the circuit elements, a length of the circuit elements, a current value of the corresponding circuit element which exceeds the corresponding specification current value or a corresponding specification current value.

In operation 710, the system for checking joule heating of an integrated circuit design divides each of the regions into a plurality of adjacent windows. In some embodiments, operation 710 is performed for each of the regions in the current hotspot report. In some embodiments, operation 710 is an embodiment of operation 206 shown in FIG. 2A with similar features. In some embodiments, each window includes one or more circuit elements. In some embodiments, each circuit element of the one or more circuit elements is associated with a corresponding current value within the window. In some embodiments, each window is associated with one or more corresponding current values. In some embodiments, each window is associated with a corresponding specification current value. In some embodiments, each window is associated with both a corresponding current value and a corresponding specification current value.

In operation 712, the system for checking joule heating of an integrated circuit design determines a power index of each window from the current value associated with one or more circuit elements within the window. In some embodiments, each power index is associated with a corresponding window. In some embodiments, operation 712 is performed for each window in the current hotspot report. In some embodiments, operation 712 is an embodiment of operation 208 shown in FIG. 2A with similar features. In some embodiments, operation 712 is implemented by method 400 shown in FIG. 4. In some embodiments, the power index is determined by formula 2A. In some embodiments, the power index is a numerical value that is a function of a total power density of the one or more circuit elements within the corresponding windows (as shown in Table 600 of FIG. 6). In some embodiments, the total power density of the one or more circuit elements within the corresponding windows is expressed by formula 3.

In operation 714, the system for checking joule heating of an integrated circuit design adjusts the specification current value associated with each of the corresponding windows. In some embodiments, an amount of adjustment of the specification current value is a function of the power index of each corresponding window. In some embodiments, operation 714 is performed for each window in the current hotspot report. In some embodiments, operation 714 is performed for each of the regions in the current hotspot report. In some embodiments, operation 714 is an embodiment of operation 210 shown in FIG. 2A with similar features. In some embodiments, operation 714 is implemented by method 300 (shown in FIG. 3) or method 500 (shown in FIG. 5). In some embodiments, operation 714 is implemented by the lookup table 600 shown in FIG. 6. In some embodiments, operation 714 is implemented by one or more of the alternative lookup tables discussed in method 500.

While method 700 utilized a lookup table (e.g., lookup table 600 in FIG. 6) including several ranges of total power densities in each of the corresponding windows in an integrated circuit design, other embodiments exist where the specification current value associated with each of the windows is adjusted based upon the power index of the window, the current values of the one or more circuit elements in the window or the equivalent resistance values of the one or more circuit elements in the window.

While method 700 utilized a lookup table (e.g., lookup table 600 in FIG. 6) including several ranges of total power densities in each of the corresponding windows in an integrated circuit design, other embodiments exist where a relationship between the total power density and the adjusted specification current value associated with each of the windows is expressed as an equation. In these embodiments, the specification current value associated with each of the windows is adjusted based upon the equation. For example, in some embodiments, the relationship between the total power density and the adjusted specification current value associated with each of the windows is expressed as a step function with a number of ranges, and corresponding total power densities over each of the ranges. For example, in some embodiments, the relationship between the total power density and the adjusted specification current value associated with each of the windows is expressed as a polynomial function or an exponential function.

In some embodiments, method 700 is utilized with a lookup table similar to that shown in FIG. 6. In some embodiments, the contents of the lookup table (e.g., lookup table 600 in FIG. 6) utilized in method 700 are varied. For example, in some embodiments, the contents of the lookup table include different ranges of the total power index of each window in an integrated circuit design, and the corresponding method 700 which utilizes the lookup table adjusts the specification current value associated with each of the windows based upon the power index of the window consistent with the teachings herein. For example, in some embodiments, the contents of the lookup table include different ranges of the current of the one or more elements in each window in an integrated circuit design, and the corresponding method 700 which utilizes the lookup table adjusts the specification current value associated with each of the windows based upon the current values of the one or more circuit elements in the window consistent with the teachings herein. For example, in some embodiments, the contents of the lookup table include different ranges of the resistances of the one or more elements in each window in an integrated circuit design, and the corresponding method 700 which utilizes the lookup table adjusts the specification current value associated with each of the windows based upon the equivalent resistance values of the one or more circuit elements in the window consistent with the teachings herein.

In operation 716, the system for checking joule heating of an integrated circuit design determines if there are current values associated with the one or more circuit elements within a corresponding window which exceed a corresponding adjusted specification current value within the corresponding window. In some embodiments, operation 716 is performed for each window in the current hotspot report. In some embodiments, operation 716 is an embodiment of operation 212 shown in FIG. 2A with similar features. If the system for checking joule heating of an integrated circuit design determines a current value associated with the one or more circuit elements within the corresponding window exceeds the corresponding adjusted specification current value of the corresponding window, the operation proceeds to 718. If the system for checking joule heating of an integrated circuit design determines that for each of the windows, each of the current values associated with the one or more circuit elements within the corresponding window do not exceed the corresponding adjusted specification current value of the corresponding window, the operation ends.

In operation 718, the system for checking joule heating of an integrated circuit design generates a current violation report of the integrated circuit. In some embodiments, operation 718 is an embodiment of operation 214 shown in FIG. 2A with similar features. In some embodiments, the current violation report generated in operation 718 is an embodiment of the current violation report generated in operation 214. The current violation report includes one or more entries. Each entry of the one or more entries is associated with both a corresponding window and one or more corresponding current values associated with one or more circuit elements within the corresponding window which exceed the corresponding adjusted specification current value of the corresponding window.

In operation 720, the system for checking joule heating of an integrated circuit design implements a design change of the integrated circuit from the current violation report. In some embodiments, a design change includes changing the width of one or more circuit elements in the integrated circuit. In some embodiments, changing the width of one or more circuit elements includes increasing the width of one or more circuit elements to lower the resistance of the one or more circuit elements and allowing a same amount of RMS current in the one or more circuit elements even with the design change. In some embodiments, a design change includes changing the position of one or more circuit elements the integrated circuit. In some embodiments, a design change includes changing the width of the integrated circuit design. In some embodiments, a design change includes changing the length of the integrated circuit design. In some embodiments, a design change includes changing the amplitude of one or more AC driving currents in one or more circuit elements of the integrated circuit design. In some embodiments, changing the amplitude of one or more AC driving currents in one or more circuit elements includes reducing the amplitude of the one or more AC driving currents. In some embodiments, a design change includes reducing the speed of one or more AC driving currents in the one or more circuit elements of the integrated circuit design.

In operation 722, the system for checking joule heating of an integrated circuit design ends. In some embodiments, the system for checking joule heating of an integrated circuit design implements a design change of the integrated circuit even though a current violation report was not generated in operation 718. In some embodiments, the system for checking joule heating of an integrated circuit design implements a design change of the integrated circuit even though each of the current values for each corresponding circuit element do not exceed the corresponding specification current value of the circuit element (as determined in operation 706). In some embodiments, in operation 722, the system for checking joule heating of an integrated circuit design implements one or more of the design changes discussed in operation 720. In some embodiments, the design change of the integrated circuit includes changing the width of the integrated circuit design. In some embodiments, a design change includes changing the length of the integrated circuit design. In some embodiments, a design change includes changing the amplitude of one or more driving currents of the integrated circuit design.

Figure 8:
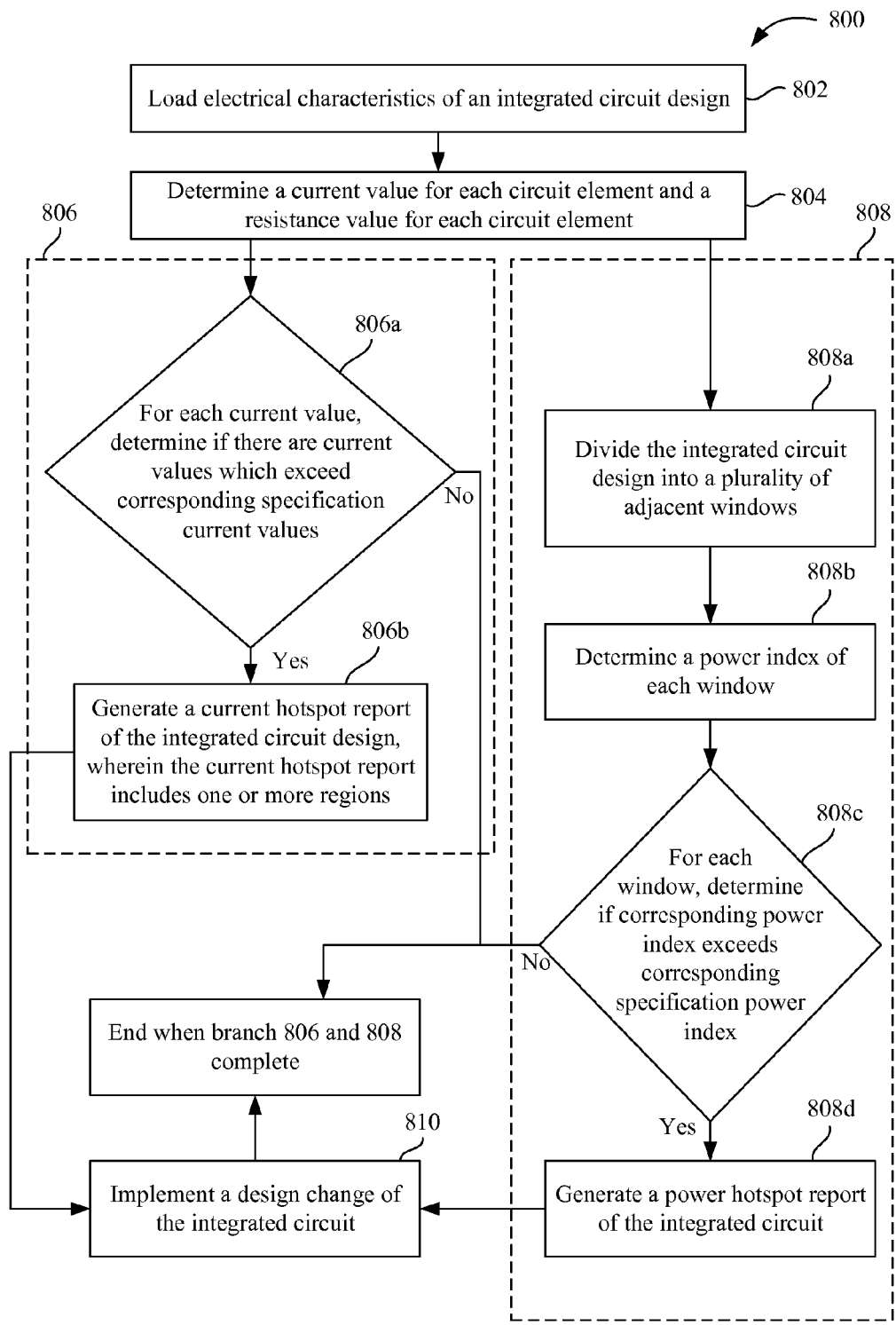
FIG. 8 is a flow chart of a method of checking joule heating of an integrated circuit in accordance with some embodiments.

FIG. 8 is a flow chart of a method 800 of checking joule heating of an integrated circuit in accordance with some embodiments. In some embodiments, the method 800 is implemented as a software application comprising computer program code for execution by a processor that is used by an EDA tool. Method 800 is an embodiment of the method 100 shown in FIG. 2A with similar operations. Method 800 comprises two parallel branches (e.g., branch 806 and branch 808). In some embodiments, method 800 is complete if branch 806 and branch 808 are performed to completion. Branch 806 includes operations 806a and 806b. Branch 808 includes operations 808a, 808b, 808c and 808d.

Method 800 begins with operation 802 in which a system for checking joule heating of an integrated circuit design loads electrical characteristics of an integrated circuit design. In some embodiments, the electrical characteristics include RC network information of each of the components in the integrated circuit design. In some embodiments, the electrical characteristics include current waveform information of each of the components in the integrated circuit design. In some embodiments, operation 802 is an embodiment of operation 202 shown in FIG. 2A with similar features.

In operation 804, the system for checking joule heating of an integrated circuit design determines a current value for each circuit element in the integrated circuit design, and determines a resistance value for each circuit element in the integrated circuit design. In some embodiments, operation 804 is an embodiment of operation 204 shown in FIG. 2A with similar features.

In operation 806*a*, the system for checking joule heating of an integrated circuit design determines if there are current values for each corresponding circuit element which exceed a corresponding specification current value of the corresponding circuit element. In some embodiments, each current value of a circuit element is associated with a corresponding specification current value of the circuit element. In some embodiments, the specification current value is associated with a corresponding circuit element. In some embodiments, operation 806*a* is an embodiment of operation 706 shown in FIG. 7A with similar features. In some embodiments, operation 806*a* is performed for each circuit element in the integrated circuit design. If the system for checking joule heating of an integrated circuit design determines a current value for a corresponding circuit element exceeds the corresponding specification current value for the corresponding circuit element, the operation proceeds to 808*b*. If the system for checking joule heating of an integrated circuit design determines that each of the current values for each corresponding circuit element does not exceed the corresponding specification current value of the corresponding circuit element, the operations of branch 806 end.

In operation 806*b*, the system for checking joule heating of an integrated circuit design generates a current hotspot report of the integrated circuit design. In some embodiments, operation 806*b* is an embodiment of operation 708 shown in FIG. 7 with similar features. The current hotspot report includes one or more regions. Each region of the one or more regions is associated with both a corresponding circuit element and a corresponding current value of the circuit element which exceeds the corresponding specification current value of the circuit element. In some embodiments, each current value is associated with a corresponding specification current value. After operation 806*b*, the operations of branch 806 are performed to completion. In some embodiments, the current hotspot report includes, for each circuit element associated with the corresponding region, a resistance of the circuit elements, a length of the circuit elements, a current value of the corresponding circuit element which exceeds the corresponding specification current value or a corresponding specification current value.

In operation 808*a*, the system for checking joule heating of an integrated circuit design divides the integrated circuit design into a plurality of adjacent windows. In some embodiments, operation 808*a* is an embodiment of operation 206 shown in FIG. 2A with similar features. In some embodiments, each window includes one or more circuit elements. In some embodiments, each circuit element of the one or more circuit elements is associated with a corresponding current value within the window. In some embodiments, each window is associated with one or more corresponding current values. In some embodiments, each window is associated with a corresponding specification current value. In some embodiments, each window is associated with both a corresponding current value and a corresponding specification current value.

In operation 808*b*, the system for checking joule heating of an integrated circuit design determines a power index of each window from the current value associated with one or more circuit elements within the window. In some embodiments, each power index is associated with a corresponding window and a corresponding specification power index. In some embodiments, operation 808*b* is performed for each window in the integrated circuit design. In some embodiments, operation 808*b* is an embodiment of operation 208 shown in FIG. 2A with similar features. In some embodiments, operation 808*b* is implemented by method 400 shown in FIG. 4. In some embodiments, the power index of each window is determined by formula 2A. In some embodiments, the power index of a window is a numerical value that is a function of a total power density of the one or more circuit elements within the corresponding windows (as shown in FIG. 6).

In operation 808*c*, the system for checking joule heating of an integrated circuit design determines if there are power index values for each corresponding window which exceed a corresponding specification power index of the corresponding window. In some embodiments, operation 808*c* is performed for each window in the integrated circuit design. If the system for checking joule heating of an integrated circuit design determines a power index for a corresponding window element exceeds the corresponding specification power index for the corresponding window, the operation proceeds to 808*d*. If the system for checking joule heating of an integrated circuit design determines that for each of the windows, the power index for a corresponding window does not exceed the corresponding specification power index for the corresponding window, the operations of branch 808 end.

In operation 808*d*, the system for checking joule heating of an integrated circuit design generates a power hotspot report of the integrated circuit design. The power hotspot report includes one or more power regions. Each power region of the one or more power regions is associated with both a corresponding window and a corresponding power index which exceeds the corresponding specification power index of the corresponding window. After operation 808*d*, the operations of branch 808 are performed to completion. In some embodiments, the power hotspot report includes, for each circuit element associated with the corresponding power region, a resistance of the circuit elements, a width of the circuit elements, a length of the circuit elements, a current value of the corresponding circuit element, a power index value of the corresponding circuit element which exceeds the corresponding specification power index value or a corresponding specification power index value.

In operation 810, the system for checking joule heating of an integrated circuit design implements a design change of the integrated circuit from the current hotspot report and the power hotspot report. In some embodiments, changing the width of one or more circuit elements includes increasing the width of one or more circuit elements to lower the resistance of the one or more circuit elements and allowing a same amount of RMS current in the one or more circuit elements even with the design change. In some embodiments, a design change includes changing the position of one or more circuit elements the integrated circuit. In some embodiments, a design change includes changing the width of the integrated circuit design. In some embodiments, a design change includes changing the length of the integrated circuit design. In some embodiments, a design change includes changing the amplitude of one or more AC driving currents in one or more circuit elements of the integrated circuit design. In some embodiments, changing the amplitude of one or more AC driving currents in one or more circuit elements includes reducing the amplitude of the one or more AC driving currents. In some embodiments, a design change includes reducing the speed of one or more AC driving currents in the one or more circuit elements of the integrated circuit design.

Figure 9:
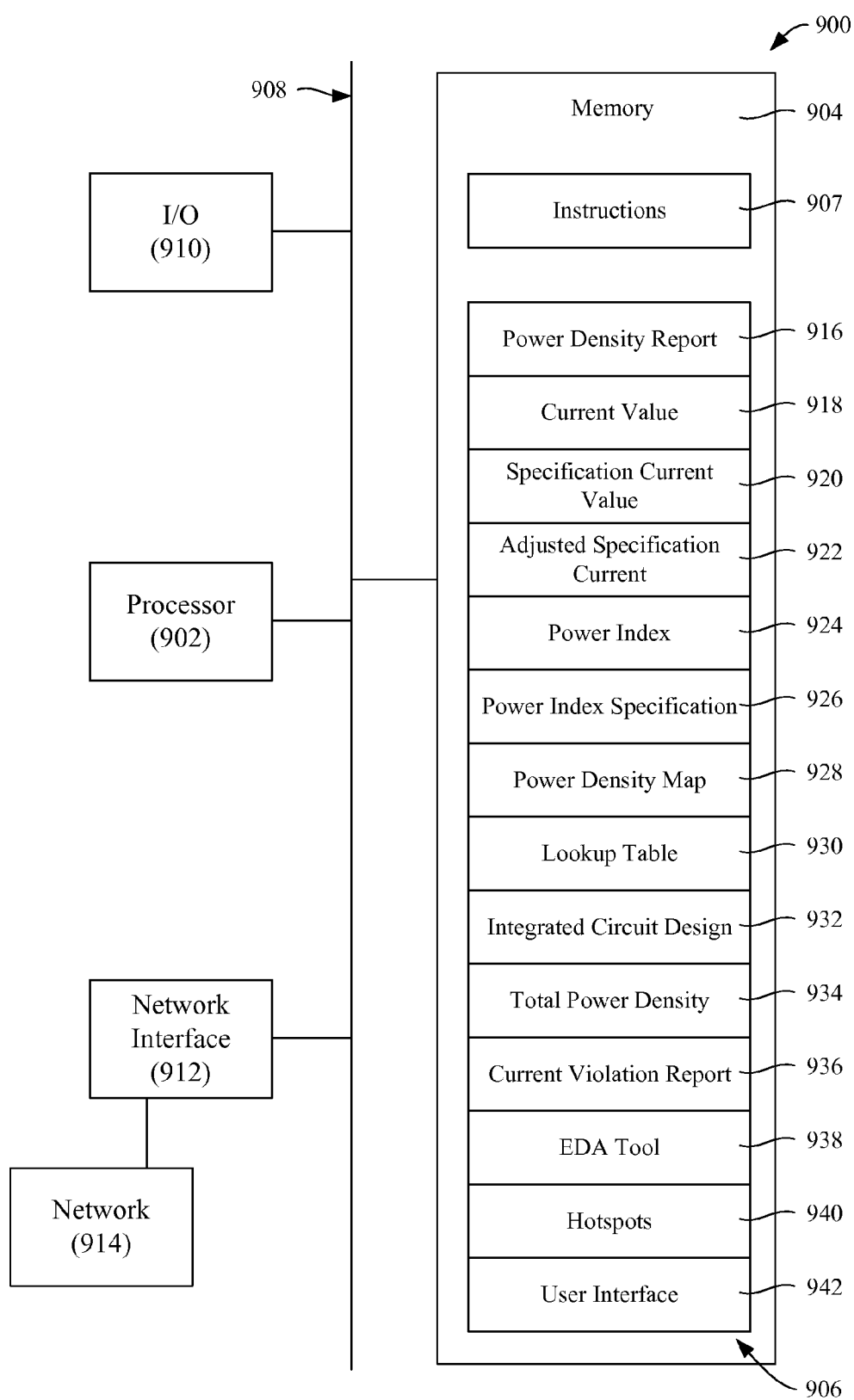
FIG. 9 is a block diagram of a control system in accordance with one or more embodiments.

FIG. 9 is a block diagram of a control system 900 for checking joule heating in an integrated circuit design in accordance with one or more embodiments. In some embodiments, the control system 900 is a general purpose computing device which implements method 200 of FIG. 2A, method 300 of FIG. 3, method 400 of FIG. 4, method 500 of FIG. 5, method 700 of FIGS. 7A-7B or method 800 of FIG. 8 in accordance with one or more embodiments.

Control system 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with manufacturing machines for producing the semiconductor device. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described e.g., in method 100, 300, 400, 500, 700 or 800.

In one or more embodiments, the processor 902 is a central processing unit (CPU), a multi-processor, a distributed processing system, an application specific integrated circuit (ASIC), and/or a suitable processing unit.

In one or more embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 904 includes a compact disk-read only memory (CD-ROM), a compact disk-read/write (CD-R/W), and/or a digital video disc (DVD).

In one or more embodiments, the storage medium 904 stores the computer program code 906 configured to cause system 900 to perform method 200, 300, 400, 500, 700 or 800. In one or more embodiments, the storage medium 904 also stores information needed for performing method 200, 300, 400, 500, 700 or 800 as well as information generated during performing method 200, 300, 400, 500, 700 or 800, such as power density report 916, current value 918, specification current value 920, adjusted specification current 922, power index 924, power index specification 926, power density map 928, lookup table 930, integrated circuit design 932, total power density 934, current violation report 936, EDA tool 938, hotspots 940, user interface (UI) 942 and/or a set of executable instructions to perform the operation of method 200, 300, 400, 500, 700 or 800. In some embodiments, UI 942 is a graphical user interface (GUI).

In one or more embodiments, the storage medium 904 stores instructions 907 for interfacing with external machines. The instructions 907 enable processor 902 to generate instructions readable by the external machines to effectively implement method 100, 300, 400, 500, 700 or 800 during a design process. In some embodiments, the design process is of a semiconductor device including one or more circuit elements. In some embodiments, the design process comprises checking joule heating of the semiconductor device or integrated circuit. The instructions 907 enable processor 902 to generate instructions readable by the external machines to effectively implement method 200, 300, 400, 500, 700 or 800 during a joule heating design check process.

Control system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

Control system 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1394. In one or more embodiments, method 100, 300, 400, 500, 700 or 800 are implemented in two or more systems 900, and information such as power density report 916, current value 918, specification current value 920, adjusted specification current 922, power index 924, power index specification 926, power density map 928, lookup table 930, integrated circuit design 932, total power density 934, current violation report 936, EDA tool 938, hotspots 940, UI 942 are exchanged between different systems 900 via network 914.

System 900 is configured to receive information related to a power density report through I/O interface 910. The information is transferred to processor 902 via bus 908 to generate the power density report. The power density report is then stored in computer readable medium 904 as power density report 916. Control system 900 is configured to receive information related to a current value through I/O interface 910. The information is stored in computer readable medium 904 as current value 918. Control system 900 is configured to receive information related to a specification current value through I/O interface 910. The information is stored in computer readable medium 904 as specification current value 920. Control system 900 is configured to receive information related to an adjusted specification current value through I/O interface 910. The information is stored in computer readable medium 904 as adjusted specification current 922. Control system 900 is configured to receive information related to a power index through I/O interface 910. The information is stored in computer readable medium 904 as power index 924. Control system 900 is configured to receive information related to a power index specification through I/O interface 910. The information is stored in computer readable medium 904 as power index specification 926. Control system 900 is configured to receive information related to a power density map through I/O interface 910. The information is stored in computer readable medium 904 as power density map 928. Control system 900 is configured to receive information related to a lookup table through I/O interface 910. The information is stored in computer readable medium 904 as lookup table 930. Control system 900 is configured to receive information related to an integrated circuit design through I/O interface 910. The information is stored in computer readable medium 904 as integrated circuit design 932. Control system 900 is configured to receive information related to a total power density through I/O interface 910. The information is stored in computer readable medium 904 as total power density 934. Control system 900 is configured to receive information related to a current violation report through I/O interface 910. The information is stored in computer readable medium 904 as current violation report 936. Control system 900 is configured to receive information related to an EDA Tool through I/O interface 910. The information is stored in computer readable medium 904 as EDA Tool 938. Control system 900 is configured to receive information related to a hotspot through I/O interface 910. The information is stored in computer readable medium 904 as hotspots 940. Control system 900 is configured to receive information related to a UI through I/O interface 910. The information is stored in computer readable medium 904 as UI 942.

In some embodiments, the implementations shown in FIGS. 1-9 provide one or more methods for checking joule heating of an integrated circuit. In some embodiments, the implementation of method 200, 300, 400, 500, 700 or 800 provides a method of checking joule heating of an integrated circuit with more accuracy when compared with other joule heating checking methods. In some embodiments, the implementation of method 200, 300, 400, 500, 700 or 800 provides a method of checking joule heating of an integrated circuit where the RMS current limit of one or more circuit elements are capable of being a higher value when compared with other integrated circuits. In some embodiments, the implementation of method 200, 300, 400, 500, 700 or 800 provides a method of checking joule heating of an integrated circuit where the RMS current of each circuit element is capable of being a different value. In some embodiments, the implementation of method 200, 300, 400, 500, 700 or 800 provides a method of checking joule heating of an integrated circuit where the change in temperature between the circuit elements and the substrate is reduced when compared with other integrated circuits. In some embodiments, the implementation of method 200, 300, 400, 500, 700 or 800 yields an integrated circuit with improved design speed and improved lifetime reliability when compared with other integrated circuits.

In some embodiments, method 200, 300, 400, 500, 700 or 800 is implemented as a standalone software application for execution by a processor. In some embodiments, method 200, 300, 400, 500, 700 or 800 is implemented as a software application that is a part of an additional software application. In some embodiments, method 200, 300, 400, 500, 700 or 800 is implemented as a plug-in to a software application. In some embodiments, method 200, 300, 400, 500, 700 or 800 is implemented as a software application that is a portion of an EDA tool.

In some embodiments, method 200, 300, 400, 500, 700 or 800 is implemented as a software application that is used by an EDA tool. In some embodiments, the EDA tool is used to generate a layout of the semiconductor device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design.

One of ordinary skill in the art would recognize that operations are able to be removed or that additional operations are able to be added to method 200, 300, 400, 500, 700 or 800 without departing from the scope of this description. One of ordinary skill in the art would also recognize that an order of operations in method 100, 300, 400, 500, 700 or 800 is able to be adjusted without departing from the scope of this description.

One aspect of this description relates to a method of checking joule heating of an integrated circuit design. The method includes dividing the integrated circuit design into a plurality of windows, determining a power index of each window from the current value associated with one or more circuit elements within the window, adjusting the specification current value associated with each of the corresponding windows and generating, by a processor, a current violation report of the integrated circuit. Each window of the plurality of windows comprises one or more circuit elements, wherein each circuit element of the one or more circuit elements is associated with a corresponding current value within the window, wherein each window is associated with a corresponding specification current value. Each power index is associated with a corresponding window. An amount of adjustment of the specification current value is a function of the power index of each corresponding window. A current violation report of the integrated circuit comprising one or more entries, wherein each entry of the one or more entries is associated with at least a corresponding window and one or more corresponding current values associated with one or more circuit elements within the corresponding window which exceed the corresponding adjusted specification current value of the corresponding window.

Another aspect of this description relates to a computer readable medium comprising computer executable instructions for carrying out a method of checking joule heating of an integrated circuit design. The method comprising generating a current hotspot report of the integrated circuit design comprising one or more regions, dividing each of the regions of the one or more regions into a plurality of windows, determining a power index of each window from the current value associated with one or more circuit elements within the window, adjusting the specification current value associated with each corresponding window and generating a current violation report of the integrated circuit. Each region of the one or more regions is associated with both one or more corresponding circuit elements, and a corresponding current value of the one or more circuit elements which exceeds a corresponding specification current value of the one or more circuit elements, wherein each current value of the one or more circuit elements is associated with a corresponding specification current value of the one or more circuit elements. Each window of the plurality of windows comprises the one or more circuit elements, each window is associated with a corresponding current value of the one or more circuit elements and a corresponding specification current value. Each power index is associated with a corresponding window. An amount of adjustment of the specification current value of each corresponding window is a function of the power index of each corresponding window. The current violation report comprises one or more entries, wherein each entry of the one or more entries is associated with at least a corresponding window and the one or more corresponding current values associated with the one or more circuit elements within the corresponding window which exceed the corresponding adjusted specification current value of the corresponding window.

Still another aspect of this description relates to a system for checking joule heating of an integrated circuit design. The system comprises at least one processor and at least one memory including computer program code for one or more programs, the at least one memory and the computer program code being configured to, with the at least one processor, cause the system to generate a current hotspot report of the integrated circuit design comprising one or more regions, divide the integrated circuit design into a plurality of windows, determine a power index of each window from the current value associated with one or more circuit elements within the window and generate a power hotspot report of the integrated circuit. Each region of the one or more regions is associated with both one or more corresponding circuit elements, and a corresponding current value of the one or more circuit elements which exceeds a corresponding first specification current value of the one or more circuit elements, wherein each current value of the one or more circuit elements is associated with a corresponding first specification current value of the one or more circuit elements. Each window comprises the one or more circuit elements, wherein each window of the plurality of windows is associated with a corresponding current value of the one or more circuit elements and a corresponding second specification current value. Each power index is associated with a corresponding window and the corresponding second specification power index. The power hotspot report comprises one or more entries, wherein each entry of the one or more entries is associated with at least a corresponding window and a corresponding power index of the window which exceeds the corresponding specification power index of the window.

The foregoing outlines features of several embodiments so that those of ordinary skill in the art may better understand the aspects of the present disclosure. Those of ordinary skill in the art should appreciate that they may readily use the present disclosure as a basis for designing or modifying other circuits, processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method of checking joule heating of an integrated circuit design, the method comprising:
   dividing the integrated circuit design into a plurality of windows, wherein each window of the plurality of windows comprises one or more circuit elements, wherein each circuit element of the one or more circuit elements is associated with a corresponding current value within the window, wherein each window is associated with a corresponding specification current value;
   determining a power index of each window from the current value associated with the one or more circuit elements within the window, wherein each power index is associated with a corresponding window;
   adjusting the specification current value associated with each corresponding window, wherein an amount of adjustment of the specification current value is a function of the power index of each corresponding window;
   generating, by a processor, a current violation report of the integrated circuit design comprising one or more entries, wherein each entry of the one or more entries is associated with at least a corresponding window and one or more corresponding current values associated with the one or more circuit elements within the corresponding window which exceed the corresponding adjusted specification current value of the corresponding window;
   adjusting the integrated circuit design based on the current violation report, and
   manufacturing a semiconductor device based on the adjusted integrated circuit design.

2. The method of claim 1, wherein the power index of each window is a function of a geometry of each of the circuit elements of the one or more circuit elements.

3. The method of claim 1, wherein the power index of each window is a function of a resistance of each of the circuit elements of the one or more circuit elements.

4. The method of claim 1, wherein the power index of each window is a function of the current value of the corresponding window.

5. The method of claim 1, wherein the determining the power index of each window comprises determining a total power density of each window, wherein each total power density is associated with a corresponding window.

6. The method of claim 5, further comprising creating a power density map from each window and each corresponding total power density, wherein each window is associated with a corresponding coordinate location, and wherein the power density map comprises the coordinate location of each corresponding window, and the corresponding total power density of each window.

7. The method of claim 5, wherein the adjusting the specification current value associated with each corresponding window comprises:
   determining a first entry in a lookup table from the total power density of the corresponding window, wherein the first entry comprises a range of total power density values;
   determining a second entry in the lookup table from the first entry, wherein the second entry is associated with a corresponding first entry, and the second entry comprises an adjusted specification current value for the corresponding window; and
   adjusting the specification current value based on the second entry in the lookup table.

8. The method of claim 1, wherein the adjusting the specification current value associated with each corresponding window comprises scaling the specification current value associated with each of the corresponding windows by a mapping function.

9. A non-transitory computer readable medium comprising computer executable instructions for carrying out a method of checking joule heating of an integrated circuit design, the method comprising:
   generating a current hotspot report of the integrated circuit design comprising one or more regions, wherein each region of the one or more regions is associated with both one or more corresponding circuit elements, and a corresponding current value of the one or more circuit elements which exceeds a corresponding specification current value of the one or more circuit elements, wherein each current value of the one or more circuit elements is associated with the corresponding specification current value of the one or more circuit elements;

dividing each of the regions of the one or more regions into a plurality of windows, wherein each window of the plurality of windows comprises the one or more circuit elements, each window is associated with the corresponding current value of the one or more circuit elements and the corresponding specification current value;

determining a power index of each window from the current value associated with the one or more circuit elements within the window, wherein each power index is associated with a corresponding window;

adjusting the specification current value associated with each corresponding window of the plurality of windows, wherein an amount of adjustment of the specification current value of each corresponding window of the plurality of windows is a function of the power index of each corresponding window of the plurality of windows;

generating a current violation report of the integrated circuit design, wherein the current violation report comprises one or more entries, wherein each entry of the one or more entries is associated with at least a corresponding window and the one or more corresponding current values associated with the one or more circuit elements within the corresponding window which exceed the corresponding adjusted specification current value of the corresponding window;

adjusting the integrated circuit design based on the current violation report, and manufacturing a semiconductor device based on the adjusted integrated circuit design.

10. The non-transitory computer readable medium of claim 9, wherein the determining the power index of each window comprises determining a total power density of each window, wherein each total power density is associated with a corresponding window.

11. The non-transitory computer readable medium of claim 10, further comprising creating a power density map from each window in the current hotspot report and each corresponding total power density in the current hotspot report, wherein each window is associated with a corresponding coordinate location, and wherein the power density map comprises the coordinate location of each corresponding window in the current hotspot report, and the corresponding total power density of each window in the current hotspot report.

12. The non-transitory computer readable medium of claim 10, wherein the adjusting the specification current value associated with each corresponding window comprises:
 determining a first entry in a lookup table from the total power density of the corresponding window, wherein the first entry comprises a range of total power density values;
 determining a second entry in the lookup table from the first entry, wherein the second entry is associated with a corresponding first entry, and the second entry comprises an adjusted specification current value for the corresponding window; and
 adjusting the specification current value based on the second entry in the lookup table.

13. The non-transitory computer readable medium of claim 9, wherein the adjusting the specification current value associated with each corresponding window comprises scaling the specification current value associated with each of the corresponding windows by a mapping function.

14. The non-transitory computer readable medium of claim 9, wherein the power index of each window is a function of the current value of the corresponding window.

15. The non-transitory computer readable medium of claim 9, wherein the power index of each window is a function of a geometry of each of the circuit elements of the one or more circuit elements.

16. A system for checking joule heating of an integrated circuit design, comprising:
 at least one processor; and
 at least one memory including computer program code for one or more programs, the at least one memory with the computer program code being executed by the at least one processor, causing the system to perform actions of:
 generating a current hotspot report of the integrated circuit design comprising one or more regions, wherein each region of the one or more regions is associated with both one or more corresponding circuit elements, and a corresponding current value of the one or more circuit elements which exceeds a corresponding first specification current value of the one or more circuit elements, wherein each current value of the one or more circuit elements is associated with the corresponding first specification current value of the one or more circuit elements;
 dividing the integrated circuit design into a plurality of windows, wherein each window comprises the one or more circuit elements, wherein each window of the plurality of windows is associated with the corresponding current value of the one or more circuit elements and a corresponding second specification current value;
 determining a power index of each window from the current value associated with the one or more circuit elements within the window, wherein each power index is associated with a corresponding window and a corresponding second specification power index;
 generating a power hotspot report of the integrated circuit design, wherein the power hotspot report comprises one or more entries, wherein each entry of the one or more entries is associated with at least a corresponding window and a corresponding power index of the window which exceeds the corresponding second specification power index of the window;
 adjusting the integrated circuit design based on the power hotspot report, and
 manufacturing a semiconductor device based on the adjusted integrated circuit design.

17. The system of claim 16, wherein the determining the power index of each window comprises determining a total power density of each window, wherein each total power density is associated with a corresponding window.

18. The system of claim 16, wherein the power index of each window is a function of the current value of the corresponding window.

19. The system of claim 16, wherein the power index of each window is a function of a geometry of each of the circuit elements of the one or more circuit elements.

20. The system of claim 16, wherein the power index of each window is a function of a resistance of each of the circuit elements of the one or more circuit elements.

* * * * *